UNITED STATES PATENT OFFICE.

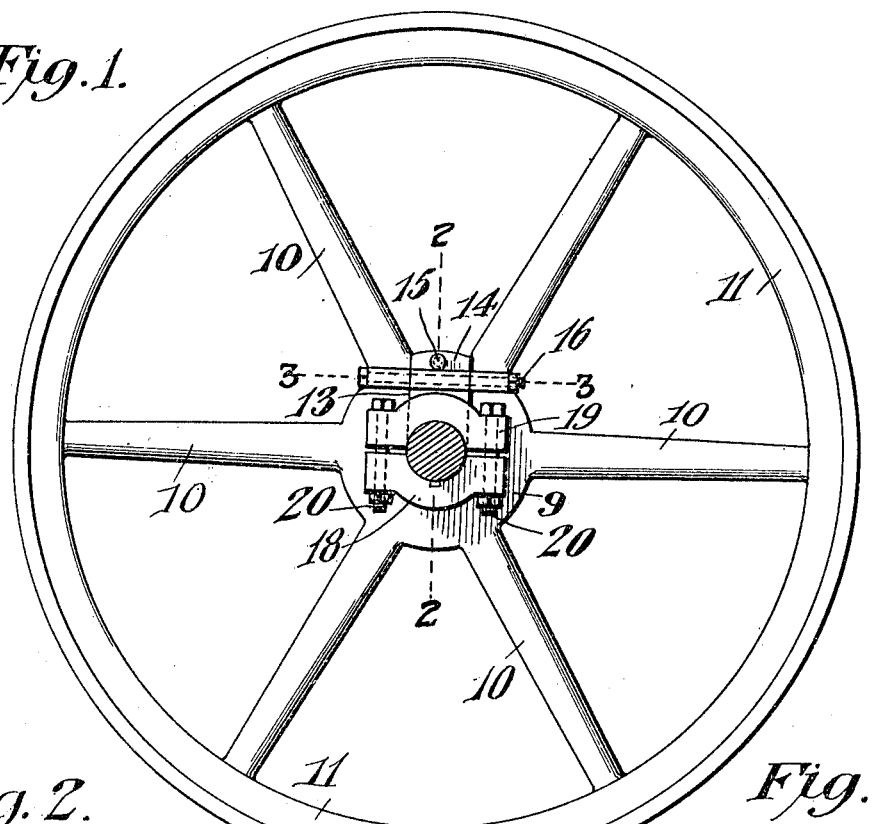

WILLIAM HARRISON FRANKLIN RAIFSNYDER, OF OIL CITY, PENNSYLVANIA.

PULLEY.

955,994.   Specification of Letters Patent.   Patented Apr. 26, 1910.

Application filed September 30, 1908. Serial No. 455,505.

*To all whom it may concern:*

Be it known that I, WILLIAM H. F. RAIFSNYDER, a citizen of the United States, residing at Oil City, in the county of Venango and State of Pennsylvania, have invented a new and useful Pulley or the Like, of which the following is a specification.

The object of the present invention is to provide a novel and simple pulley, gear wheel, fly wheel or the like that can be placed upon and adjusted along a shaft without difficulty and without the use of sledges, drifts, or the like, said pulley including means for securely clamping it to the shaft in any desired position.

Two embodiments of the invention are disclosed in the accompanying drawings, wherein:—

Figure 1 is a side elevation of one form of construction. Figs. 2 and 3 are sectional views on the lines 2—2 and 3—3 of Fig. 1. Fig. 4 is a view partially in elevation and partially in section of one of the clamping block sections. Fig. 5 is an end view of the same. Fig. 6 is a detail view of a modified form of construction. Fig. 7 is a sectional view on the line 7—7 of Fig. 6. Fig. 8 is a plan view of the clamping block disclosed in Figs. 6 and 7.

Similar reference numerals designate corresponding parts in all the figures of the drawings.

Referring to the embodiment disclosed in Figs. 1–5 inclusive, the pulley consists of a hub 9 having radiating spokes 10, which carry the usual rim 11. This hub has a central shaft-receiving opening 12 and a slot 13, which extends from the opening through the periphery of the hub between adjacent spokes 10. The width of this slot is equal to the diameter of the opening, and thus a shaft can be passed laterally into said opening through the slot.

A combined filling and clamping block is employed that is composed of sections 14, which are located side by side in the slot 13, and have their outer ends connected by a bolt 15. A tie bolt 16, extending across the slot and engaging the hub at its juncture with the spokes that are located on opposite sides of said slot, passes between the sections 14, said sections having a seat 17 to receive the bolt, and said seat being formed partially in each section. The hub is provided on its opposite sides with projecting portions or flanges 18 that are disposed on the opposite side of the shaft-receiving opening to the slot and the clamping block sections 14 in like manner have corresponding outstanding projections or flanges 19, which are associated with the flanges 18 and extend on opposite sides of the opening and the shaft passing through the opening. Bolts 20, passing through the ends of the projections or flanges, serve to secure the block sections in place and clamp them against the shaft.

With this construction, it will be evident that a pulley may be placed upon and adjusted longitudinally along the shaft with ease and expedition as long as the clamping block sections are removed. At the same time, these sections can be readily placed in position and bolted and when so secured, the pulley is effectively held against movement on the shaft.

A more simple form of construction is illustrated in Figs. 6, 7 and 8. In this embodiment of the invention, the hub is designated 21, and has the usual radiating spokes 22, carrying the rim, not shown. A central shaft-receiving opening 23 is formed in the hub and a slot 24 extends from the opening through the periphery of the hub between adjacent spokes. Said hub is provided with opposite outstanding flanges or extensions 25. The clamping block, designated 26, is a single piece that fills the slot 24, and has opposite outstanding flanges 27 coöperating with the flanges 25 of the hub. Bolts 28, passing through the coacting flanges, serve to effectively secure the block in place.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. The combination of a hub having a slot extending parallel with the axis thereof for permitting a shaft to be entered in or removed from the hub, a block filling the slot to retain the shaft in the hub, said block being divisible on a plane transverse to the axis of the hub, a fastening device extending through the hub transversely to the slot and between the sections of the block, and additional fastening devices for securing the sections of the block to the hub.

2. A wheel, comprising a hub, spokes radiating from the hub and a rim carried by the spokes, said hub having a shaft-receiving opening and a slot extending from the opening through the periphery of the hub between adjacent spokes, a clamping block located in the slot and comprising separate sections arranged side by side and abutting against each other, and means passing transversely through the hub and across said slot for securing the sections to the hub.

3. A wheel, comprising a hub, spokes radiating from the hub and a rim carried by the spokes, said hub having a shaft-receiving opening and a slot extending from the opening through the periphery of the hub between adjacent spokes, a tie bolt extending across the slot at the juncture of said adjacent spokes with the hub, a clamping block comprising sections located side by side in the slot and having a seat between them for the tie bolt, a bolt connecting the outer ends of the sections, said hub sections having associated projections on opposite sides of the hub, and bolts passing through the associated projections.

In testimony, that I claim the foregoing as my own, I have hereto affixed my signature in the presence of two witnesses.

WILLIAM HARRISON FRANKLIN RAIFSNYDER.

Witnesses:
  C. L. DOWNING,
  JOHN L. BROMLEY.